United States Patent

[11] 3,539,019

| [72] | Inventors | Elvin Mattson and Allen D. Mattson, both of Box 409, Grafton, North Dakota 58237 |
|---|---|---|
| [21] | Appl. No. | 746,374 |
| [22] | Filed | July 22, 1968 |
| [45] | Patented | Nov. 10, 1970 |

[54] ROW CROP HARROW ATTACHMENT DEVICE
2 Claims, 2 Drawing Figs.

[52] U.S. Cl. ................................................ 172/512, 172/688, 172/762
[51] Int. Cl. ......................................................... A01b 17/00, A01b 23/00, A01b 39/22
[50] Field of Search ........................................... 172/762, 776, 687, 688, 744, 740, 640, 644, 508, 502

[56] References Cited
UNITED STATES PATENTS

| 2,064,269 | 12/1936 | Pope | 172/624 |
| 2,934,155 | 4/1960 | McMaster | 172/688X |
| 3,049,184 | 8/1962 | Lohrman | 172/707 |
| 3,155,169 | 11/1964 | Mattson et al. | 172/512 |

Primary Examiner—Robert E. Bagwill
Assistant Examiner—Stephen C. Pellegrino
Attorney—Williamson, Palmatier and Bains ABSTRACT: A row crop harrow attachment device including a frame comprised of an elongate frame member having a pair of transverse frame members secured thereto and each supporting a plurality of earth penetrating tines. An L-shaped standard for mounting the frame on an implement frame to permit the harrow frame to be adjustable longitudinally of the L-shaped standard. The row crop harrow attachment device when mounted on an implement frame serves to cultivate the space between adjacent crop rows.

Patented Nov. 10, 1970 3,539,019

INVENTORS
ALLEN D. MATTSON,
ELVIN MATTSON
BY Williamson, Palmatier
& Bains
ATTORNEYS

ROW CROP HARROW ATTACHMENT DEVICE

SUMMARY OF THE INVENTION

The cultivating tools used with most row crop cultivators comprise shovels or sweeps which serve to cultivate the soil to only a relatively shallow depth. It has been found that in a number of instances these shallow row crop cultivators, such as shovels or sweeps do not penetrate sufficiently deep enough to destroy the roots of weeds and the like.

It is therefore a general object of this invention to provide a relatively small compact row crop harrow attachment device, which is adapted to very effectively cultivate the soil between adjacent crop rows. This novel row crop harrow attachment includes a plurality of earth penetrating tines which are not only arranged and constructed to very effectively penetrate the soil to a depth to sufficiently destroy the roots of weeds and the like, but these tines also serve to cultivate the soil into a prime condition and at a greater depth than conventional cultivator tools.

These and other objects and advantages of this invention will more fully appear from the following description made in connection with the accompanying drawings wherein like reference characters refer to the same or similar parts throughout the several views.

DETAILED DESCRIPTION OF THE INVENTION

Figure 1:
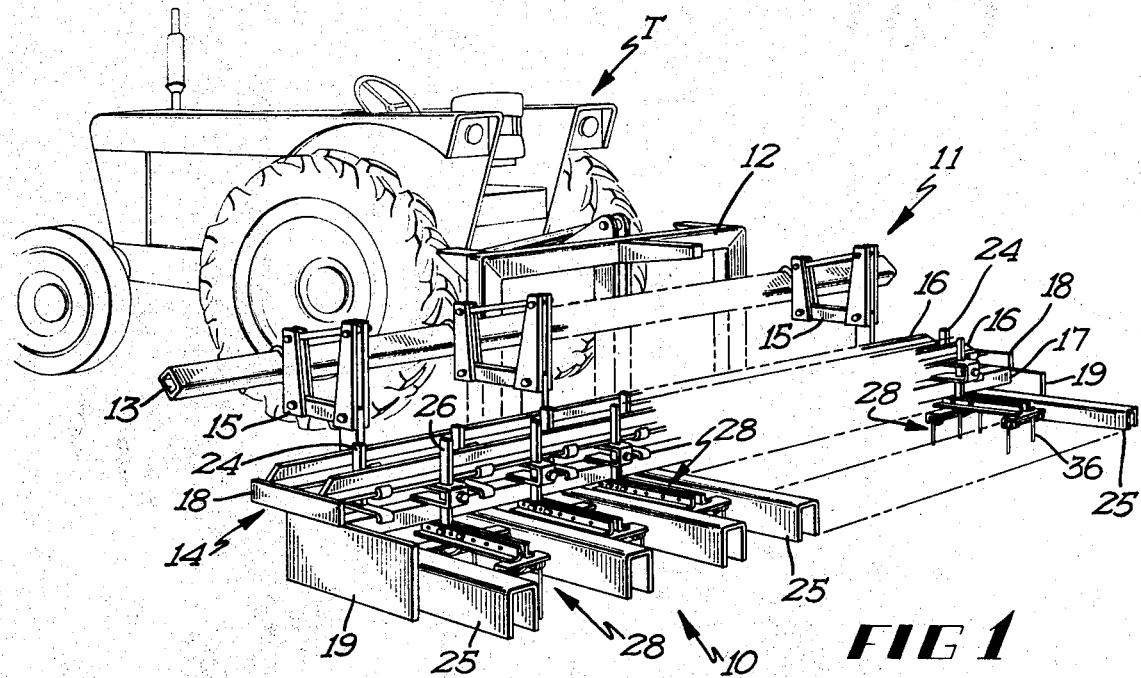
FIG. 1 is a perspective view of a row crop cultivator implement incorporating the novel row crop harrow attachment device.

Referring now to the drawings it will be seen that a plurality of the row crop harrow attachment devices 10 are mounted on a row crop harrow implement 11 which is connected in towed relation to a tractor T by conventional hitch 12. It will be noted that the hitch 12 is connected to the draw bar 13 of the row crop harrow implement 11. The draw bar 13 is connected to the implement frame 14 by means of coupling members 15 which permit vertical shifting movement of the implement frame.

The implement frame 14 is comprised of a plurality of elongate transversely extending upper frame members 16 of angle construction and a plurality of elongate transverse lower frame members 17 which, as shown, are of rectangular cross-sectional configuration. Longitudinally extending side frame members 18 rigidly interconnect the upper frame members 16 together and longitudinally extending vertically oriented side plates 19 are rigidly connected to the lower frame members 17. The upper and lower frame members are also rigidly interconnected together and it will be seen that these upper and lower frame members extend transversely of the direction of travel of the implement.

The implement frame 14 has a plurality of generally C-shaped mounting brackets 20 of conventional construction rigidly affixed to the upper and lower frame member 16 and 17 as by welding. It will be noted that the legs 21 of each bracket 20 have registering openings therein while the bight or web portion 22 of the mounting bracket is provided with a threaded aperture which threadedly receives a bolt 23. It is also pointed out that each transverse upper frame member 16 is positioned in substantially vertically aligned relation with one of the transverse lower frame members 17. It will be noted that the vertically disposed standards 24 of the inverted channel shaped cultivator shields 25 are detachably secured to those C-shaped mounting brackets which are secured to the forwardmost upper and lower transverse frame members. These cultivator shield members 25 are preferably of the type disclosed in my U.S. Pat. No. 3,155,169, and these shields ride over the row of crop rows during the cultivating operation. These shields 25 are pivotally connected to the lower end portions of the standards 25 to permit pivoting in the manner set forth in my U.S. Pat. No. 3,155,169.

The row crop harrow attachment devices 10 each have an elongate generally vertically disposed standard 26 which has a mounting arm 27 secured to the lower end thereof and projecting rearwardly in substantially right angular relation therefrom. It will be seen that the standard 26 projects through the apertures in the legs of each mounting bracket 20 and is secured in place by the bolt 23. In the embodiment shown, the standard 26 is of rectangular cross-sectional configuration but this standard may also be of substantially circular configuration in the event that the apertures in the C-shaped bracket are of circular configuration.

The mounting arm 27 has a plurality of apertures therein and is detachably secured to the mounting frame 28 of the row crop harrow attachment device 10. The mounting frame 28 includes a longitudinal frame member 29 which is comprised of a pair of elongate angle shaped longitudinal frame elements 30. The longitudinal frame elements 30 are rigidly affixed to a front transverse frame member 31 and a rear transverse frame member 32 as by welding. It will be noted that the front and rear transverse frame members are of angle construction as are the longitudinal frame elements 30. The longitudinal frame elements 30 are laterally spaced apart from each other to define an elongate slot 33 therebetween and these longitudinal frame elements are provided with registering apertures 34 therethrough. Thus an aperture in one longitudinal frame element 30 is disposed in registering relation with an aperture in the other longitudinal frame element.

The mounting arm 27 of the standard 26 is positioned in the slot 33 between the longitudinal frame elements 30 and is secured to the latter by suitable nut and bolt assemblies 35 which extend through the apertures in the mounting arm and the longitudinal frame elements. It will be noted the longitudinal frame elements 30 and the slot defined therebetween are substantially longer than the mounting arm 27 thus permitting longitudinal adjustment of the row crop harrow attachment device 10 with respect to the mounting arm.

Figure 2:
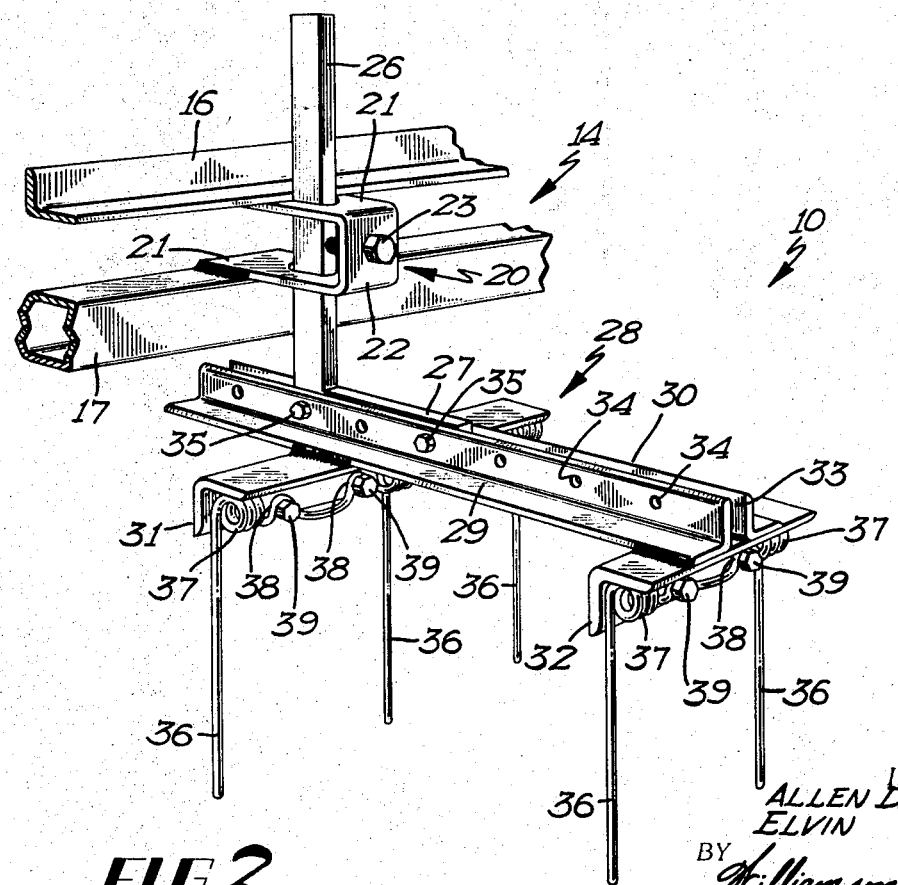
FIG. 2 is a perspective view on an enlarged scale illustrating the row crop harrow attachment device.

The front and rear transverse frame members are provided with a plurality of earth penetrating tines 36 each being bent at its upper end to define a coil spring 37 as best seen in FIG. 2. In the embodiment shown, a pair of tines 36 are formed from a single piece of material with suitable loops 38 formed to accommodate nut and bolt assemblies 39 so that the tines may be mounted on the respective depending legs of the front and rear transverse frame members. In this regard, it is pointed out that the depending legs of the front and rear transverse frame members are suitably apertured to accommodate the nut and bolt assemblies 39.

In the embodiment shown, the rear transverse frame member has a longitudinal dimension less than that of the front transverse frame member and accommodates only a pair of tines 36. The front transverse frame member has three tines secured thereto, two of which are formed from a single piece of metal. The other tine of the forwardmost transverse frame member is also provided with a coil spring at its upper end and a mounting loop to permit mounting thereof on the front transverse frame member. These tines 36 are generally known as vibrating tines because of the spring construction at the upper end thereof and this vibration effect serves to break up lumps, helps level ridges and loosens soil so that it is in prime condition.

It will further be noted that the tines on the rear transverse frame member are disposed in staggered relation with respect to the tines on the front transverse frame member. In this regard, it will be noted that the area cultivated by each attachment device 10 corresponds to the space between adjacent crop rows. It will also be noted that the overall length of the harrow attachment device 10 is slightly less than the overall length of the cultivator shields 25. In the embodiment shown, a plurality of harrow attachment devices 10 are provided and are positioned between adjacent cultivator shields 25. However, it is pointed out that the harrow attachment devices 10 may be used without the cultivator shields under certain circumstances.

During use, the row crop harrow attachment devices will be mounted on the implement frame 14 preferably, from the rearmost mounting brackets 20 and will be positioned between adjacent cultivator shields 25. As the implement 11 is towed forwardly by the tractor, the vibrating tines 36 of the attachment device 10 will penetrate the soil to a depth of at least 6 inches between adjacent row crops. The cultivator shield 25, if used, will protect the plants during this cultivating operation. These vibrating tines will break up the lumps between the rows, level ridges and loosens the soil so that the soil is in substantially prime condition for growth of the crops. The staggered relation of the tines and the fore and aft spacing thereof serves to very effectively act upon substantially the entire space between adjacent crop rows.

From the foregoing description it will be seen that I have provided a novel row crop harrow attachment device which is operative to not only condition the soil for optimum crop growth but penetrates to a depth sufficient to destroy the roots of weeds. This deep cultivation and soil conditioning of the attachment devices 10 is a functional advantage which cannot be obtained by conventional cultivator sweeps.

Thus it will be seen that I have provided a novel row crop harrow attachment device which is not only of simple and inexpensive construction but one which functions in a more efficient manner than any heretofore known comparable device.

It will, of course, be understood that various changes may be made in the form, details, arrangement and proportions of the various parts without departing from the scope of my invention.

We claim:

1. In combination with an implement frame including a plurality of laterally spaced apart similar channel-shaped cultivator shields, each adapted to straddle and shield a row crop to be cultivated, a plurality of similar laterally spaced apart row crop harrow attachment devices mounted on said implement frame each attachment device positioned between a pair of said shields whereby a plurality of the row crop harrow attachment devices supported by the implement frame will be positioned between crop rows to cultivate the soil therebetween, each row crop harrow attachment device comprising an elongate vertically oriented standard, attachment means on said frame engaging the upper end of the standard on the implement frame for vertical adjustment relative thereto, said standard having a mounting arm affixed to the lower end thereof and extending rearwardly at substantially right angles thereto in the direction of the crop row:

a support frame including an elongate longitudinal frame member extending in the direction of the crop rows, means releasably securing said longitudinal frame member to said mounting arm, said frame member comprising a pair of elongate longitudinal frame elements disposed in side by side closely proximal spaced relation with respect to each other to define a slot therebetween, said mounting arm of the standard being positioned within said slot and having a length dimension substantially smaller than the length dimension of said slot whereby said mounting frame may be adjusted longitudinally of the mounting arm;

a pair of longitudinally spaced apart transverse frame members fixedly connected with the longitudinal frame member and extending transversely of the crop rows, at least one of said frame members being of a width corresponding to the width of the space between adjacent crop rows, the length dimension of one of said transverse frame members being less than the length dimension of the other transverse frame member, the length dimension of said longitudinal frame member being less than the length of said cultivator shields; and a plurality of tines affixed to each of said transverse frame members and depending therefrom, the tines on the one transverse frame member being staggered with respect to the tines on the other frame member whereby said tines penetrate and cultivate the soil between adjacent crop rows, each of said tines having its upper end thereof coiled to form a coiled spring so that during movement of said tines through the soil, the tines tend to vibrate.

2. The row crop harrow attachment device as defined in claim 1 wherein said means securing said longitudinal frame member to said mounting arm comprises a plurality of apertures in each of said longitudinal frame elements, each aperture in one longitudinal frame element being disposed in registering relation with respect to an aperture in the other longitudinal frame element, said mounting arm of said standard having a plurality of apertures therein, and nut and bolt assemblies extending through the apertures in said mounting frame elements and the mounting arm to releasably mount the mounting frame on the mounting arm.